(12) United States Patent
Shimizu et al.

(10) Patent No.: US 8,531,630 B2
(45) Date of Patent: *Sep. 10, 2013

(54) LIQUID CRYSTAL PANEL AND LIQUID CRYSTAL DISPLAY APPARATUS

(75) Inventors: Takashi Shimizu, Osaka (JP); Kentarou Yoshida, Osaka (JP); Naotaka Kinjo, Osaka (JP); Nao Murakami, Osaka (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 769 days.

This patent is subject to a terminal disclaimer.

(21) Appl. No.: 12/299,656

(22) PCT Filed: Jun. 22, 2007

(86) PCT No.: PCT/JP2007/062572
§ 371 (c)(1),
(2), (4) Date: Nov. 5, 2008

(87) PCT Pub. No.: WO2008/004451
PCT Pub. Date: Jan. 10, 2008

(65) Prior Publication Data
US 2009/0207347 A1 Aug. 20, 2009

(30) Foreign Application Priority Data
Jul. 7, 2006 (JP) ................................. 2006-187650

(51) Int. Cl.
*G02F 1/1335* (2006.01)

(52) U.S. Cl.
USPC ............................... 349/96; 349/118; 349/119

(58) Field of Classification Search
USPC ............................................ 349/96, 118, 119
See application file for complete search history.

(56) References Cited

U.S. PATENT DOCUMENTS 7,012,663 B2  3/2006  Ono et al.
7,289,266 B1  10/2007 Kamijo et al.
(Continued)

FOREIGN PATENT DOCUMENTS

JP  07-120745 A    5/1995
JP  10221684 A  *  8/1998
(Continued)

OTHER PUBLICATIONS

Fuji Photo Film Co Ltd., Polarizing plate and liquid crystal display device, Apr. 8, 2006, machine translation of JP 2006-091369A from Patent Abstracts of Japan website, pp. 1-80.*

(Continued)

*Primary Examiner* — Edward Glick
*Assistant Examiner* — Dennis Y Kim
(74) *Attorney, Agent, or Firm* — Westerman, Hattori, Daniels & Adrian, LLP

(57) ABSTRACT

There is provided a liquid crystal display panel having a high contrast ratio in a front direction. A liquid crystal panel of the present invention includes: a liquid crystal cell; a first polarizing plate placed on one side of the liquid crystal cell; and a second polarizing plate placed on another side of the liquid crystal cell. A transmittance ($T_1$) of the first polarizing plate is higher than a transmittance ($T_2$) of the second polarizing plate. Preferably, a difference ($\Delta T = T_1 - T_2$) between the transmittance ($T_1$) of the first polarizing plate and the transmittance ($T_2$) of the second polarizing plate is 0.1% to 6.0%.

10 Claims, 2 Drawing Sheets

(56) References Cited

U.S. PATENT DOCUMENTS

| | | |
|---|---|---|
| 8,031,296 B2 * | 10/2011 | Maezawa et al. ............... 349/96 |
| 8,125,596 B2 | 2/2012 | Murakami |
| 8,355,102 B2 * | 1/2013 | Kitagawa et al. ............. 349/119 |
| 2004/0239852 A1 | 12/2004 | Ono et al. |
| 2005/0195348 A1 * | 9/2005 | Saitoh et al. .................. 349/118 |
| 2005/0285286 A1 * | 12/2005 | Shuto et al. .................. 264/1.34 |
| 2006/0098147 A1 | 5/2006 | Murakami |
| 2007/0242353 A1 | 10/2007 | Kamijo et al. |
| 2009/0091682 A1 | 4/2009 | Murakami et al. |

FOREIGN PATENT DOCUMENTS

| | | |
|---|---|---|
| JP | H10-221684 A | 8/1998 |
| JP | 2000-29017 A | 1/2000 |
| JP | 2001-83328 A | 3/2001 |
| JP | 2003-344657 A | 12/2003 |
| JP | 2005-331773 A | 12/2005 |
| JP | 2006-18317 A | 1/2006 |
| JP | 2006-091369 A | 4/2006 |
| JP | 2006-133626 A | 5/2008 |
| TW | 200622317 A | 9/1994 |
| WO | 2006/120856 A1 | 11/2006 |

OTHER PUBLICATIONS

Canon Inc, Aug. 21, 1998, Machine Translation of JP H10-221684 A from Patent Abstracts of Japan Website, pp. 1-17.*

International Search Report of PCT/JP2007/062572, Mailing Date of Sep. 25, 2007.

Taiwanese Office Action dated Oct. 27, 2011, issued in corresponding Taiwanese Patent Application No. 096124354, W/English Translation.

Japanese Office Action dated Nov. 24, 2011, issued in corresponding Japanese Patent Application No. 2006-187650, W/English Translation.

Japanese Office Action dated Oct. 10, 2012, issued in corresponding Japanese Patent Application No. 2006-187650, with English translation (9 pages).

Japanese Office Action dated Oct. 10, 2012, issued in corresponding Japanese Patent Application No. 2012-006869, with English translation (9 pages).

Japanese Information Offer Form dated Aug. 3, 2011, issued in corresponding Japanese Patent Application No. 2006-187650 (with English Translation).

* cited by examiner

LIQUID CRYSTAL PANEL AND LIQUID CRYSTAL DISPLAY APPARATUS

BACKGROUND OF THE INVENTION (1) Field of the Invention

The present invention relates to a liquid crystal panel including two polarizing plates having different transmittance with each other, and a liquid crystal display apparatus.

(2) Description of Related Art

A liquid crystal display apparatus (hereinafter, referred to as LCD) is a device which displays characters and images, using the electrooptical characteristics of liquid crystal molecules. The LCD generally uses a liquid crystal panel in which polarizing plates are placed on both sides of a liquid crystal cell, and can display a black image under no voltage application in a normally black mode, for example. The LCD has a problem in that a contrast ratio in front and oblique directions is low. In order to solve this problem, a liquid crystal panel using a retardation film has been disclosed (for example, see Patent Document 1). However, the further increase in performance of the LCD is desired on the market, and as one example, there is a demand for a liquid crystal display apparatus exhibiting a higher contrast ratio, capable of outputting characters and images more clearly.

Patent Document 1: JP 3648240 B

BRIEF SUMMARY OF THE INVENTION

It is an object of the present invention to provide a liquid crystal display panel having a high contrast ratio in a front direction.

The present inventors have conducted intensive studies for solving the above problems, and have found that the above objects can be attained with the liquid crystal panel described below, to thereby complete the present invention.

A liquid crystal panel according to an embodiment of the present invention includes: a liquid crystal cell; a first polarizing plate placed on one side of the liquid crystal cell; and a second polarizing plate placed on another side of the liquid crystal cell. The first polarizing plate includes a first polarizer and a first protective layer which is placed on a liquid crystal cell side of the first polarizer, and a refractive index ellipsoid of the first protective layer exhibits a relationship of nx>ny>nz. A transmittance ($T_1$) of the first polarizing plate is higher than a transmittance ($T_2$) of the second polarizing plate.

In a preferred embodiment of the invention, a difference ($\Delta T = T_1 - T_2$) between the transmittance ($T_1$) of the first polarizing plate and the transmittance ($T_2$) of the second polarizing plate is 0.1% to 6.0%.

In a preferred embodiment of the invention, the liquid crystal cell contains liquid crystal molecules arranged in a homeotropic alignment.

In a preferred embodiment of the invention, the second polarizing plate is placed on a viewer side of the liquid crystal cell, and the first polarizing plate is placed on an opposite side of the viewer side of the liquid crystal cell.

In a preferred embodiment of the invention, the first polarizer and the second polarizer each contain as a main component a polyvinyl alcohol-based resin containing iodine.

In a preferred embodiment of the invention, a difference ($\Delta I = I_2 - I_1$) between an iodine content ($I_2$) of the second polarizer and an iodine content ($I_1$) of the first polarizer is 0.1% by weight to 2.6% by weight.

In a preferred embodiment of the invention, an iodine content of each of the first polarizer and the second polarizer is 1.8% by weight to 5.0% by weight.

In a preferred embodiment of the invention, a slow axis direction of the first protective layer is substantially perpendicular to an absorption axis direction of the first polarizer.

In a preferred embodiment of the invention, a thickness direction retardation value (Rth[590]) at a wavelength of 590 nm of the first protective layer is 50 nm to 500 nm.

In a preferred embodiment of the invention, an Nz coefficient of the first protective layer is more than 1.1 to 8 or less.

In a preferred embodiment of the invention, the first protective layer is a retardation film (A) containing a polyimide-based resin or a cellulose-based resin or a laminate (B) formed of a polyimide-based resin-containing retardation film ($b_1$) and a cellulose-based resin-containing retardation film ($b_2$).

In a preferred embodiment of the invention, the liquid crystal panel is in a normally black mode.

According to another aspect of the present invention, a liquid crystal display apparatus is provided. The liquid crystal display apparatus includes the above-described liquid crystal panel.

By using two polarizing plates having different transmittance with each other, a liquid crystal display apparatus including a liquid crystal panel of the present invention has a remarkably high contrast in a front direction, compared with conventional liquid crystal panel.

Figure 1:
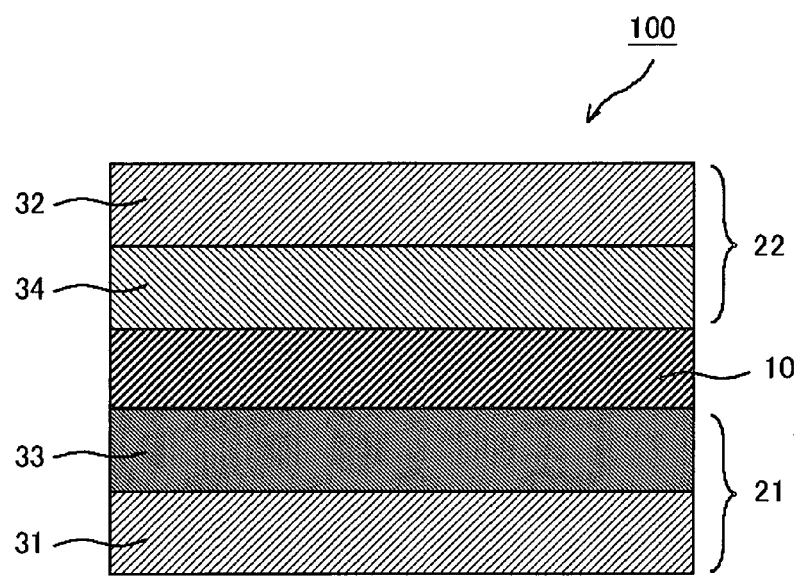
FIG. 1 Schematic cross-sectional view of a liquid crystal panel according to a preferred embodiment of the present invention.

| Description of Reference Numerals | |
|---|---|
| 10 | Liquid crystal cell |
| 21 | First polarizing plate |
| 22 | Second polarizing plate |
| 31 | First polarizer |
| 32 | Second polarizer |
| 33 | First protective layer |
| 34 | Second protective layer |
| 100 | Liquid crystal panel |
| 80 | Backlight unit |
| 81 | Light source |
| 82 | Reflective film |
| 83 | Diffusion plate |
| 84 | Prism sheet |
| 85 | Brightness enhancing film |
| 200 | Liquid crystal display apparatus |
| 300 | Feed part |
| 301 | Polymer film |
| 310 | Swelling bath |
| 311, 312, 321, 322, 331, 332 | Roll |
| 320 | Coloring bath |
| 330 | First cross-linking bath |
| 340 | Second cross-linking bath |
| 350 | Water washing bath |
| 360 | Drying means |
| 370 | Polarizer |
| 380 | Take-up part |

DETAILED DESCRIPTION OF THE INVENTION

Definition of Terms and Symbols

The definition of the terms and symbols in the specification of the present invention are as follows.

(1) Light Transmittance of Polarizing Plate

A light transmittances (T) of a polarizing plate refers to a Y value of tristimulus values obtained through visibility correction by a two-degree field of view in accordance with JIS Z 8701-1995.

(2) Refractive Index (nx, ny and nz)

"nx" represents a refractive index in a direction in which an in-plane refractive index becomes maximum (i.e., in a slow axis direction), "ny" represents a refractive index in a direction perpendicular to the slow axis in the same plane (i.e., in a fast axis direction), and "nz" represents a refractive index in a thickness direction.

(3) In-Plane Retardation Value

An in-plane retardation value ($Re[\lambda]$) refers to an in-plane retardation value of a film at a wavelength $\lambda$ (nm) at 23° C. $Re[\lambda]$ is obtained by $Re[\lambda]=(nx-ny)\times d$ where the thickness of the film is d (nm).

(4) Thickness Direction Retardation Value

A thickness direction retardation value ($Rth[\lambda]$) refers to a retardation value in a film thickness direction at a wavelength $\lambda$ (nm) at 23° C. $Rth[\lambda]$ is obtained by $Rth[\lambda]=(nx-nz)\times d$ where the thickness of the film is d (nm).

(5) Birefringence in Thickness Direction

A birefringence ($\Delta n_{xz}[\lambda]$) in a thickness direction is obtained by $\Delta n_{xz}[\lambda]=Rth[\lambda]/d$, where $Rth[\lambda]$ refers to a retardation value in a film thickness direction at a wavelength $\lambda$ (nm) at 23° C. and d refers to the thickness (nm) of the film.

(6) Nz Coefficient

An Nz coefficient is obtained by $Nz=Rth[590]/Re[590]$.

(7) In the specification of the present invention, the phrase "nx=ny" or "ny=nz" not only refers to a case where they are completely equal but also includes a case where they are substantially equal. Therefore, for example, the phrase "nx=ny" includes a case where Re[590] is less than 10 nm.

(8) In the specification of the present invention, the phrase "substantially perpendicular" includes a case where an angle formed by two optical axes is 90°±2.0°, and preferably 90°±1.0°. The phrase "substantially parallel" includes a case where an angle formed by two optical axes is 0°±2.0°, and preferably 0°±1.0°.

(9) In the specification of the present invention, for example, the subscript "1" attached to a term or symbol represents a first polarizing plate, and the subscript "2" represents a second polarizing plate.

<A. Outline of Liquid Crystal Panel>

A liquid crystal panel of the present invention includes at least a liquid crystal cell, a first polarizing plate placed on one side of the liquid crystal cell, and a second polarizing plate placed on the other side of the liquid crystal cell. The first polarizing plate includes a first polarizer and a first protective layer which is placed on a liquid crystal cell side of the first polarizer, and a refractive index ellipsoid of the first protective layer exhibits a relationship of nx>ny>nz. A transmittance ($T_1$) of the first polarizing plate is higher than a transmittance ($T_2$) of the second polarizing plate. The liquid crystal panel is preferably in a normally black mode. In the specification of the present invention, the term "normally black mode" refers to a liquid crystal panel in which a transmittance becomes minimum (a screen becomes dark) under no voltage application, and the transmittance increases under voltage application.

A difference ($\Delta T=T_1-T_2$) between a transmittance ($T_1$) of the first polarizing plate and a transmittance ($T_2$) of the second polarizing plate is preferably 0.1% to 6.0%, more preferably 0.1% to 4.5%, particularly preferably 0.2% to 3.0%, and most preferably 0.3% to 2.5%. By using two polarizing plates having a difference in transmittance in the above range, a liquid crystal display apparatus with a further higher contrast ratio in a front direction can be obtained.

The liquid crystal panel of the present invention has a feature in that a contrast ratio in a front direction is remarkably higher than that of a conventional liquid crystal panel (typically, a liquid crystal panel in which the transmittances of two polarizing plates placed on both sides of a liquid crystal cell are the same). In this manner, it is a discovery which has been found out by the inventors of the present invention for the first time, which is an unexpectedly excellent effect, that by placing a polarizing plate having a protective layer in which the refractive index ellipsoid exhibits a relationship of nx>ny>nz and another polarizing plate (typically, an ordinary polarizing plate) on respective sides of a liquid crystal cell, and by making a transmittance of the polarizing plate having a protective layer in which the refractive index ellipsoid exhibits a relationship of nx>ny>nz higher than a transmittance of the another polarizing plate, a liquid crystal display apparatus with a high contrast ratio in a front direction can be provided. The above effect is particularly prominent in a liquid crystal panel in a normally black mode which displays a black image without driving liquid crystal molecules in the liquid crystal cell. The reason therefor is considered to be that the effect obtained by using two polarizing plates having different transmittance with each other is not inhibited by driving of the liquid crystal molecules.

FIG. 1 is a schematic cross-sectional view of a liquid crystal panel according to a preferred embodiment of the present invention. Note that, for better viewing, the proportion of length, width, and thickness for each of the constituting members shown in FIG. 1 is different from the actual proportion. A liquid crystal panel 100 of FIG. 1 includes a liquid crystal cell 10, a first polarizing plate 21 placed on one side of the liquid crystal cell 10, and a second polarizing plate 22 placed on another side of the liquid crystal cell 10. The first polarizing plate 21 includes a first polarizer 31 and a first protective layer 33 which is placed on a liquid crystal cell side of the first polarizer 31. The second polarizing plate 22 includes a second polarizer 32 and a second protective layer 34 which is placed on a liquid crystal cell side of the second polarizer 32. In the illustrated example, the first polarizing plate 21 is placed on a lower part of the liquid crystal cell 10, and the second polarizing plate 22 is placed on an upper part of the liquid crystal cell, but the liquid crystal panel of the present invention may have a structure in which the above structure is turned upside down.

Note that, for a practical use, another appropriate protective layer and an appropriate surface treated layer may be placed on the opposite side of the side, on which the liquid crystal cell is arranged, of the first and/or the second polarizer. Further, an appropriate adhesion layer may be provided between the constituting members of the liquid crystal panel. The term "adhesion layer" refers to a layer that connects surfaces of adjacent members and integrate them with a practically sufficient adhesive strength and adhesive time. Examples of a material for forming the adhesion layer include an adhesive, a pressure-sensitive adhesive, and an anchor coat agent. The adhesion layer may have a multi-layered structure in which an anchor coat layer is formed on the surface of an adherend and an adhesive layer or a pressure-sensitive adhesive layer is formed thereon. Further, the adhesion layer may be a thin layer (which may be referred to as hair line) which cannot be recognized with naked eyes. Hereinafter, the constituting members used in the present invention are described in detail, but are not only limited to the following specific embodiments.

<B. Liquid Crystal Cell>

As the liquid crystal cell used in the present invention, any suitable one can be adopted. Examples of the above liquid crystal cell include an active matrix type using a thin film transistor and a simple matrix type adopted in a super-twisted nematic liquid crystal display apparatus.

The liquid crystal cell preferably includes a pair of substrates and a liquid crystal layer as a display medium placed between the pair of substrates. On one substrate (active matrix substrate), switching elements (typically, TFTs) for controlling the electrooptical characteristics of liquid crystal, and scanning lines that provide a gate signal to the switching elements and signal lines that provide a source signal to the switching elements are provided. On the other substrate (color filter substrate), a color filter is provided.

The color filter may be provided on the active matrix substrate. Alternatively, in the case where an RGB 3-color light source (which may further include a multi-color light source) is used for illumination means of a liquid crystal display apparatus as in a field sequential system, the above-mentioned color filter can be omitted. The interval between two substrates is controlled with spacers. On a side of each substrate, which is in contact with a liquid crystal layer, an alignment film made of, for example, polyimide is provided. Alternatively, for example, in the case where the initial alignment of liquid crystal molecules is controlled using a fringe electric field formed by a patterned transparent electrode, the alignment film can be omitted.

The liquid crystal cell preferably contains liquid crystal molecules arranged in a homeotropic alignment. In the specification of the present invention, the term "homeotropic alignment" refers to the state in which an alignment vector of liquid crystal molecules is aligned vertically (in a normal direction) with respect to the plane of a substrate as a result of the interaction between the substrate subjected to an alignment treatment and liquid crystal molecules. The homeotropic alignment also includes the case where the alignment vector of liquid crystal molecules is slightly inclined with respect to the direction normal to a substrate, i.e., the case where liquid crystal molecules have a pretilt. In the case where liquid crystal molecules have a pretilt, the pretilt angle (angle from the normal line of the substrate) is preferably 5° or less. By setting the pretilt angle in the above range, a liquid crystal display apparatus with a high contrast ratio can be obtained.

In the liquid crystal cell, preferably, a refractive index ellipsoid has a relationship of nz>nx=ny. Examples of the driving mode using a liquid crystal cell in which a refractive index ellipsoid has a relationship of nz>nx=ny include, in accordance with the classification by a driving mode, a vertical alignment (VA) mode, a twisted nematic (TN) mode, a vertical alignment type electric field control birefringence (ECB) mode, and an optical compensation birefringence (OCB) mode. Preferably, the liquid crystal cell is in a vertical alignment (VA) mode.

The liquid crystal cell of a VA mode allows liquid crystal molecules arranged in a homeotropic alignment in the absence of an electric field to respond with an electric field in a direction normal to a substrate, using a voltage control birefringence effect. Specifically, for example, as described in JP 62-210423 A and JP 04-153621 A, in the case of a normally black mode, liquid crystal molecules are arranged in a direction normal to a substrate in the absence of an electric field, so a black display is obtained when upper and lower polarizing plates are placed such that the respective absorption axes are perpendicular to each other. On the other hand, under electric field application, liquid crystal molecules are operated so as to be tilted at an azimuth of 45° with respect to an absorption axis of a polarizing plate, whereby a light transmittance increases to obtain a white display.

The liquid crystal cell of a VA mode may be set to be a multi-domain by using an electrode with a slit or a base material with protrusions formed on its surface, as described in JP 11-258605 A, for example. Examples of such a liquid crystal cell include an ASV (Advanced Super View) mode manufactured by Sharp Corporation, a CPA (Continuous Pinwheel Alignment) mode manufactured by Sharp Corporation, a MVA (Multi-domain Vertical Alignment) mode manufactured by Fujitsu Ltd., a PVA (Patterned Vertical Alignment) mode manufactured by Samsung Electronics Co., Ltd., an EVA (Enhanced Vertical Alignment) mode manufactured by Samsung Electronics Co., Ltd., and SURVIVAL (Super Ranged Viewing by Vertical Alignment) mode manufactured by Sanyo Electric Co., Ltd.

$Rth_{LC}[590]$ under no electric field application of the liquid crystal cell is preferably −500 nm to −200 nm, and more preferably −400 nm to −200 nm. The above $Rth_{LC}[590]$ is appropriately set based on the birefringence of liquid crystal molecules and a cell gap. The cell gap (substrate interval) of the liquid crystal cell is generally 1.0 μm to 7.0 μm.

As the liquid crystal cell, the one mounted on a commercially available liquid crystal display apparatus may be used as it is. Examples of the commercially available liquid crystal display apparatuses including a liquid crystal cell of a VA mode include a liquid crystal television "AQUOS series" (trade name) manufactured by Sharp Corporation, a liquid crystal television "BRAVIA series" (trade name) manufactured by Sony Corporation, a 32V-type wide liquid crystal television "LN32R51B" (trade name) manufactured by SAMSUNG, a liquid crystal television "FORIS SC26XD1" (trade name) manufactured by NANAO Corporation, and a liquid crystal television "T460HW01" (trade name) manufactured by AU Optronics.

<C. Polarizing Plate>

A first polarizing plate used in the present invention includes a first polarizer and a first protective layer which is placed on a liquid crystal cell side of the first polarizer. A second polarizing plate preferably includes a second polarizer and a second protective layer which is placed on a liquid crystal cell side of the second polarizer. An absorption axis direction of the first polarizing plate is preferably substantially perpendicular to an absorption axis direction of the second polarizing plate. Generally, the polarizing plates each have a thickness of 20 μm to 500 μm.

In one embodiment, the second polarizing plate is placed on a viewer side of the liquid crystal cell, and the first polarizing plate is placed on an opposite side of the viewer side of the liquid crystal cell. This is because, by placing the polarizing plate with high transmittance on a backlight side so as to allow light from the backlight to be incident upon the liquid crystal cell as much as possible, a high brightness (white brightness) is easily obtained when a white image or a color image is displayed. In another embodiment, when a black image is displayed by placing a polarizing plate with low transmittance on a viewer side so as to make it difficult for light from the backlight to leak to a viewer side, a brightness (black brightness) can be suppressed to be low. Consequently, a liquid crystal display apparatus with high contrast ratio can be obtained.

The transmittance ($T_1$) of the first polarizing plate is preferably 41.1% to 44.3%, more preferably 41.4% to 44.3%, particularly preferably 41.7% to 44.2%, and most preferably 42.0% to 44.2%. By setting $T_1$ in the above range, a liquid crystal display apparatus with much higher contrast ratio in a front direction can be obtained.

The transmittance ($T_2$) of the second polarizing plate is preferably 38.3% to 43.3%, more preferably 38.6% to 43.2%, particularly preferably 38.9% to 43.1%, and most preferably 39.2% to 43.0%. By setting $T_2$ in the above range, a liquid crystal display apparatus with much higher contrast ratio in a front direction can be obtained.

As a method of increasing or decreasing the light transmittance of the polarizing plate, for example, in the case where a polarizer mainly containing a polyvinyl alcohol-based resin containing iodine is used, there is a method of adjusting the content of iodine in the polarizer. Specifically, when the content of iodine in the polarizer is increased, the light transmittance of the polarizing plate can be decreased. When the content of iodine in the polarizer is decreased, the light transmittance of the polarizing plate can be increased. This method is also applicable for producing a roll-shaped polarizing plate and a sheet-shaped polarizing plate. The details of the polarizer will be described later.

The degree of polarization (P) of the first polarizing plate and/or the second polarizing plate is preferably 99% or more, more preferably 99.5% or more, and much more preferably 99.8%. By setting the degree of polarization (P) in the above range, a liquid crystal display apparatus with much higher contrast ratio in a front direction can be obtained.

The degree of polarization can be determined by using a spectrophotometer "DOT-3" (trade name, manufactured by Murakami Color Research Laboratory). The degree of polarization can be determined by: measuring a parallel light transmittance ($H_0$) and a perpendicular light transmittance ($H_{90}$) of the polarizer; and using the following equation: degree of polarization (%)=$\{(H_0-H_{90})/(H_0+H_{90})\}^{1/2} \times 100$. The parallel light transmittance ($H_0$) refers to a light transmittance of a parallel laminate polarizing plate produced by piling two identical polarizing plates such that respective absorption axes are parallel to each other. The perpendicular light transmittance ($H_{90}$) refers to a light transmittance of a perpendicular laminate polarizing plate produced by piling two identical polarizing plates such that respective absorption axes are perpendicular to each other. Those light transmittances refer to a Y value of tristimulus values obtained through visibility correction by a two-degree field of view in accordance with JIS Z 8701-1995.

<D. Polarizer>

In the present invention, "polarizer" converts natural light or polarized light into linearly polarized light. Any appropriate polarizer may be selected for the polarizer. Preferably, the polarizer has functions of separating incident light into two polarized components which are perpendicular to each other, transmitting one of the polarized components, and absorbing, reflecting, and/or scattering the other polarized component.

The first polarizer and the second polarizer used in the present invention each preferably contain as a main component a polyvinyl alcohol-based resin containing iodine. The first and second polarizers can be generally obtained by stretching a polymer film containing as a main component a polyvinyl alcohol-based resin containing iodine. Those polarizers are excellent in optical properties.

The relationship between the iodine content ($I_1$) of the first polarizer and the iodine content ($I_2$) of the second polarizer is preferably $I_2>I_1$. A difference ($\Delta I=I_2-I_1$) between the iodine content ($I_2$) of the second polarizer and the iodine content ($I_1$) of the first polarizer is preferably 0.1% by weight to 2.6% by weight, more preferably 0.1% by weight to 2.0% by weight, particularly preferably 0.1% by weight to 1.4% by weight, and most preferably 0.15% by weight to 1.2% by weight. By setting the relationship of the iodine contents of the respective polarizers in the above range, a polarizing plate having a transmittance relationship in a preferred range is obtained, whereby a liquid crystal display apparatus with a high contrast ratio in a front direction can be obtained.

The iodine content of each of the first polarizer and the second polarizer is preferably 1.8% by weight to 5.0% by weight, and more preferably 2.0% by weight to 4.0% by weight. The iodine content of the first polarizer is preferably 1.8% by weight to 3.5% by weight, more preferably 1.9% by weight to 3.2% by weight, and particularly preferably 2.0% by weight to 2.9% by weight. The iodine content of the second polarizer is preferably 2.3% by weight to 5.0% by weight, more preferably 2.5% by weight to 4.5% by weight, and particularly preferably 2.5% by weight to 4.0% by weight. By setting the iodine content of each polarizer in the above range, a polarizing plate with a light transmittance in a preferred range is obtained, whereby a liquid crystal display apparatus with high contrast ratio in a front direction can be obtained.

Preferably, each of the first polarizer and the second polarizer further contains potassium. The potassium content is preferably 0.2% by weight to 1.0% by weight, more preferably 0.3% by weight to 0.9% by weight, and particularly preferably 0.4% by weight to 0.8% by weight. By setting the potassium content in the above range, a polarizing plate with a light transmittance in a preferred range and high degree of polarization can be obtained.

Preferably, each of the first polarizer and the second polarizer further contains boron. The boron content is preferably 0.5% by weight to 3.0% by weight, more preferably 1.0% by weight to 2.8% by weight, and particularly preferably 1.5% by weight to 2.6% by weight. By setting the boron content in the above range, a polarizing plate with a light transmittance in a preferred range and high degree of polarization can be obtained.

The polyvinyl alcohol-based resin may be prepared by saponifying vinyl ester-based polymer obtained by polymerizing a vinyl ester-based monomer. A degree of saponification of the polyvinyl alcohol-based resin is preferably 95.0 mol % to 99.9 mol %. The degree of saponification of the polyvinyl alcohol-based resin may be determined in accordance with JIS K6726-1994. Use of the polyvinyl alcohol-based resin, the degree of saponification of which falls within the above ranges, can provide a polarizer having excellent durability.

The polyvinyl alcohol-based resin may have any suitable average degree of polymerization in accordance with the purpose. The average degree of polymerization is preferably 1,200 to 3,600. The average degree of polymerization of the polyvinyl alcohol-based resin can be measured through a method in accordance with JIS K6726-1994.

As a method of obtaining a polymer film mainly containing the polyvinyl alcohol-based resin, any suitable forming method can be adopted. As a specific example of the forming method, there is a method described in JP 2000-315144 A [Example 1].

A polymer film containing the polyvinyl alcohol-based resin as a main component preferably contains a plasticizer and/or a surfactant. Examples of the plasticizer include polyhydric alcohols such as ethylene glycol and glycerin. An example of the surfactant includes a non-ionic surfactant. The contents of the plasticizer and surfactant are preferably more than 1 to 10 parts by weight with respect to 100 parts by weight of a polyvinyl alcohol-based resin. The polyhydric alcohol and the surfactant are used for the purpose of further enhancing the dyeability and stretchability of a polarizer.

As the polymer film mainly containing the polyvinyl alcohol-based resin, a commercially available product can be used as it is. Specific examples of the commercially available polymer film mainly containing a polyvinyl alcohol-based resin include "Kuraray Vinylone Film" (trade name) manufactured by Kuraray Co., Ltd., "Tohcello Vinylone Film" (trade name) manufactured by Tohcello Co., Ltd., and "Nichigo Vinylone Film" (trade name) manufactured by The Nippon Synthetic Chemical Industry, Co., Ltd.

Figure 2:
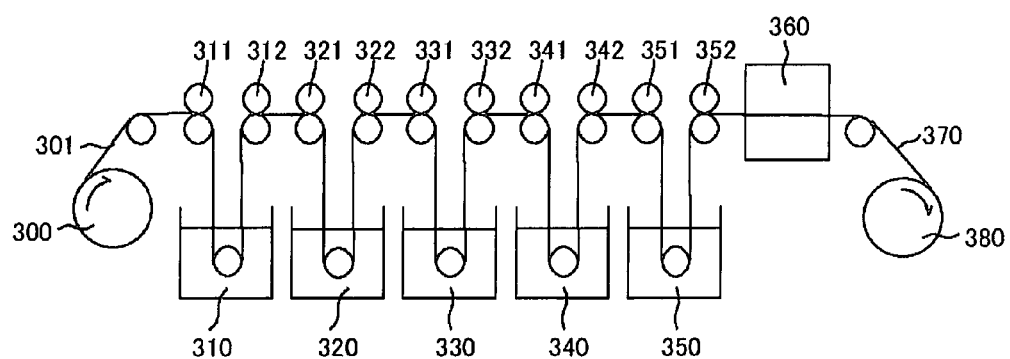
FIG. 2 Schematic diagram illustrating a concept of a typical production process of a polarizer used in the present invention.

An example of the method of producing a polarizer will be described referring to FIG. 2. FIG. 2 is a schematic view showing a concept of a typical method of producing a polarizer used in the present invention. For example, a polymer film 301 containing a polyvinyl alcohol-based resin as a main component is fed from a feed part 300, immersed in a swelling bath 310 containing pure water and a coloring bath 320 containing an aqueous iodine solution, so as to be subjected to swelling treatment and coloring treatment under tension in a longitudinal direction of the film by rollers 311, 312, 321, and 322 at different speed ratios. Potassium iodide may be added in the coloring bath. Next, the film subjected to swelling treatment and coloring treatment is immersed in a first crosslinking bath 330 and a second crosslinking bath 340 containing potassium iodide, so as to be subjected to crosslinking treatment and final stretching treatment under tension in a longitudinal direction of the film by rollers 331, 332, 341, and 342 at different speed ratios. Boric acid may be added in the first cross-linking bath and/or the second cross-linking bath. The film subjected to crosslinking treatment is immersed in a water washing bath 350 containing pure water by rollers 351 and 352, so as to be subjected to water washing treatment. The film subjected to water washing treatment is dried by drying means 360 to adjust its moisture content at, for example, 10% to 30%, and taken up in a take-up part 380. The polymer film containing a polyvinyl alcohol-based resin as a main component may be stretched to a 5 times to 7 times length of the original length through the above-mentioned processes, to thereby obtain a polarizer 370.

In the above coloring process, in order to obtain a polarizing plate having excellent optical properties, the adding amount of iodine in a coloring bath is preferably 0.01 part by weight to 0.15 part by weight and more preferably 0.01 part by weight to 0.05 part by weight with respect to 100 parts by weight of water. When the adding amount of iodine in a coloring bath is increased in the above range, a polarizing plate with a low transmittance can be obtained as a result. Further, when the adding amount of iodine in a coloring bath is decreased in the above range, a polarizing plate with a high transmittance can be obtained as a result.

The adding amount of potassium iodide in the above coloring bath is preferably 0.05 part by weight to 0.5 part by weight and more preferably 0.1 part by weight to 0.3 part by weight with respect to 100 parts by weight of water. By setting the adding amount of potassium iodide in the above range, a polarizing plate with a transmittance in a preferred range and a high polarization degree can be obtained.

In the above coloring process, in order to obtain a polarizing plate having excellent optical properties, the adding amount of potassium iodide in the first cross-linking bath and the second cross-linking bath is preferably 0.5 part by weight to 10 parts by weight and more preferably 1 part by weight to 7 parts by weight with respect to 100 parts by weight of water. The adding amount of boric acid in the first cross-linking bath and the second cross-linking bath is preferably 0.5 part by weight to 10 parts by weight and more preferably 1 part by weight to 7 parts by weight. By setting the adding amount of potassium iodide and boric acid in the above range, a polarizing plate with a transmittance in a preferred range and a high polarization degree can be obtained.

<E. First Protective Layer>

A first protective layer used in the present invention is placed between the first polarizer and the liquid crystal cell. The first protective layer is, for example, used in order to prevent the first polarizer from contracting and expanding. The first protective layer is preferably bonded to the first polarizer via an adhesion layer. The first protective layer may be a single layer or a laminate formed of a plurality of layers. The thickness of the first protective layer is preferably 10 μm to 200 μm. The transmittance (T[590]) at a wavelength of 590 nm of the first protective layer is preferably 90% or more.

In the first protective layer, the refractive index ellipsoid exhibits a relationship of nx>ny>nz (negative biaxiality) Any appropriate retardation film which exhibits an optical anisotropy may be used for the first protective layer as long as the refractive index ellipsoid exhibits, as a whole layer, a relationship of nx>ny>nz. The first protective layer may be formed of, for example: (1) one or a plurality of retardation films in which the refractive index ellipsoid exhibits a relationship of nx>ny>nz; (2) one or a plurality of retardation films in which the refractive index ellipsoid exhibits a relationship of nx>ny=nz and one or a plurality of retardation films in which the refractive index ellipsoid exhibits a relationship of nx=ny>nz; or (3) one or a plurality of retardation films in which the refractive index ellipsoid exhibits a relationship of nx>ny>nz, and one or a plurality of retardation films in which the refractive index ellipsoid exhibits a relationship of nx=ny>nz or one or a plurality of retardation films in which the refractive index ellipsoid exhibits a relationship of nx>ny=nz. Examples of particularly preferred embodiment of the first protective layer in the present invention include: one retardation film in which the refractive index ellipsoid exhibits a relationship of nx>ny>nz (typically, a stretched film of a polymer film); a laminate of one retardation film in which the refractive index ellipsoid exhibits a relationship of nx>ny>nz and one retardation film in which the refractive index ellipsoid exhibits a relationship of nx=ny>nz; and a laminate of two retardation films in which the refractive index ellipsoid exhibits a relationship of nx>ny>nz. It is preferred that at least one retardation film in the laminate be a film formed by solvent casting. It is more preferred that, in the laminate, one retardation film be a film formed by solvent casting and the other film be a stretched film of a polymer film.

A layer in which the refractive index ellipsoid exhibits a relationship of nx>ny>nz can optically compensate a liquid crystal cell only by placing one layer between a first polarizer and a second polarizer. Accordingly, there is an advantage that a thin liquid crystal panel at a low cost can be obtained. A liquid crystal panel in a mode of compensating the liquid crystal cell by using only one layer which optically exhibits anisotropy is also referred to as "liquid crystal panel of one-layer compensation mode".

It is preferred that a slow axis direction of the first protective layer is preferably substantially perpendicular to an absorption axis direction of the first polarizer. The angle between the slow axis direction of the first protective layer and the absorption axis direction of the first polarizer is preferably in a range of 90°±2° and more preferably in a range of 90°±1°. By setting the angle between the two optical axes within the above range, a liquid crystal display apparatus with a further higher contrast ratio in a front direction can be obtained.

A thickness direction retardation value (Rth[590]) at a wavelength of 590 nm of the first protective layer is greater than an in-plane retardation value (Re[590]). A difference (Rth[590]–Re[590]) between Rth[590] and Re[590] is preferably 10 nm to 400 nm or more, more preferably 30 nm to 300 nm, and particularly preferably 50 nm to 250 nm.

Re[590] of the first protective layer is preferably 10 nm or more, more preferably 20 nm to 160 nm, and particularly preferably 30 nm to 80 nm. Rth[590] of the first protective layer is preferably 50 nm to 500 nm, more preferably 100 nm to 400 nm, and particularly preferably 150 nm to 300 nm. By setting Re[590] and Rth[590] within the above range, a liquid crystal display apparatus exhibiting excellent display characteristics with a high contrast ratio in an oblique direction in addition to a front direction can be obtained.

Nz coefficient of the first protective layer is more than 1. Nz coefficient is preferably more than 1.1 to 8 or less, more preferably 2 to 7, and particularly preferably 3 to 6. By setting Nz coefficient within the above range, a liquid crystal panel of one-layer compensation mode can be obtained. Further, a liquid crystal display apparatus exhibiting excellent display characteristics with a high contrast ratio in an oblique direction in addition to a front direction can be obtained.

As a material for forming the first protective layer, any suitable material can be adopted as long as a refractive index ellipsoid thereof exhibits a relationship of nx>ny>nz. In one embodiment, the first protective layer is a retardation film containing at least one kind of thermoplastic resin selected from the group consisting of a polyimide-based resin, a cellulose-based resin, a norbornene-based resin, a polycarbonate-based resin, a polyamide-based resin, and a polyester-based resin. The retardation film preferably contains 60 parts by weight to 100 parts by weight of the thermoplastic resin with respect to 100 parts by weight of the total solid content. The retardation film is typically a stretched film.

In the specification of the present invention, "thermoplastic resin" includes a polymer having a polymerization degree of 20 or more and a high weight average molecular weight (so-called polymer), and also includes a low polymer in which the degree of polymerization is 2 or more to less than 20 and the weight average molecular weight is about several thousand (so-called oligomer). Further, in the specification of the present invention, "resin" may be a homopolymer obtained from one kind of monomer or a copolymer obtained from two or more kinds of monomers.

In another embodiment, the first protective layer is a retardation film (A) containing a polyimide-based resin or a cellulose-based resin or a laminate (B) formed of a polyimide-based resin-containing retardation film (b$_1$) and a cellulose-based resin-containing retardation film (b$_2$). The laminate (B) may be a laminate in which the polyimide-based resin-containing retardation film is bonded to the cellulose-based resin-containing retardation film via an adhesion layer or a laminate in which the polyimide-based resin-containing retardation film is directly formed on a surface of the cellulose-based resin-containing retardation film by methods such as welding. It is particularly preferred that the polyimide retardation film (b$_1$) be directly formed on the cellulose-based film (b$_2$), because the fact that the adhesion layer is not required may further contribute to reducing the thickness of a liquid crystal panel.

In the laminate (B), the polyimide-based resin-containing retardation film (b$_1$) often exhibits a character that the retardation thereof decreases as the wavelength becomes longer (so-called positive wavelength dispersion characteristics), and a cellulose-based resin-containing retardation film (b$_2$) often exhibits a character that the retardation thereof increases as the wavelength becomes longer (so-called reverse wavelength dispersion characteristics). In those cases, a ratio of thicknesses between the retardation films (b$_1$) and (b$_2$) of the laminate (B) may be appropriately changed, for example, to thereby make the wavelength dispersion characteristics of the laminate (B) suitable for the optical compensation of a liquid crystal cell.

[Polyimide-Based Resin]

In the case where the polyimide-based resin is formed into a sheet by solvent casting, molecules are likely to be aligned spontaneously during an evaporation step of a solvent. Therefore, a significantly thin retardation film whose refractive index ellipsoid exhibits a relationship of nx=ny>nz can be produced. A retardation film whose refractive index ellipsoid exhibits a relationship of nx>ny>nz can be obtained by shrinking and/or stretching the above-described film whose refractive index ellipsoid exhibits a relationship of nx=ny>nz in at least one directions. In the case where the polyimide-based resin is used as a material for forming the retardation film, desired optical anisotropy can be obtained without employing a complex stretching method. Thus, even in the case where a retardation film with a large width is produced for a large liquid crystal display apparatus, a slow axis is likely to be uniform in a width direction, and an axis shift is small even when the retardation film is attached to a polarizer. Consequently, a liquid crystal display apparatus with high contrast ratio in a front direction can be obtained.

The thickness of the retardation film containing the polyimide-based resin is preferably 0.5 µm to 10 µm, and more preferably 1 µm to 5 µm. The birefringence ($\Delta n_{xz}[590]$) in a thickness direction of a retardation film containing the polyimide-based resin is preferably 0.01 to 0.12, and more preferably 0.02 to 0.08. Such a polyimide-based resin can be obtained by a method described in U.S. Pat. No. 5,344,916.

Preferably, the polyimide-based resin has a hexafluoroisopropylidene group and/or a trifluoromethyl group. More preferably, the polyimide-based resin includes a repeating unit represented by the following general formula (I) or a repeating unit represented by the following general formula (II). Since the polyimide-based resin including these repeating units has excellent solubility with respect to a general-purpose solvent, it is possible to form a thin film by a solvent casting method. Furthermore, a thin layer of the polyimide-based resin can be formed on a substrate having insufficient solvent resistance, made of for example triacetylcellulose, without corroding the surface of the substrate.

[Chemical Formula 1]

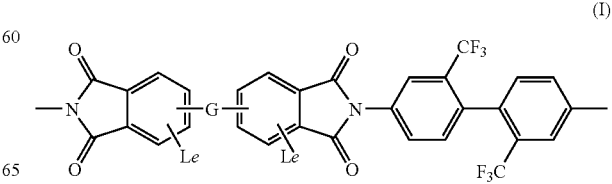

(I)

[Chemical Formula 2]

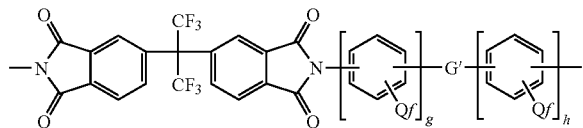

(II)

In the above general formulae (I) and (II), G and G' represent groups independently selected from a covalent bond, a group, a $C(CH_3)_2$ group, a $C(CF_3)_2$ group, a $C(CX_3)_2$ group (herein, X is halogen), a CO group, an O atom, an S atom, a $SO_2$ group, a $Si(CH_2CH_3)_2$ group, and a $N(CH_3)$ group, and they may be the same or different.

In the above general formula (I), L represents a substituent, and e represents a substitution number thereof. L is, for example, halogen, an alkyl group containing 1 to 3 carbon atoms, a halogenated alkyl group containing 1 to 3 carbon atoms, a phenyl group, or a substituted phenyl group. In the case where L represents plural substituents, they may be the same or different. e represents an integer of 0 to 3.

In the above general formula (II), Q represents a substituent, and f represents a substitution number thereof. Q is, for example, an atom or a group selected from hydrogen, halogen, an alkyl group, a substituted alkyl group, a nitro group, a cyano group, athioalkyl group, an alkoxy group, an aryl group, a substituted aryl group, an alkylester group, and a substituted alkylester group. In the case where Q represents plural substituents, they may be the same or different. f is an integer from 0 to 4, and each of g and h is an integer of 1 to 3.

The polyimide-based resin can be obtained, for example, by the reaction between tetracarboxylic dianhydride and diamine. The repeating unit in the general formula (I) can be obtained, for example, by using 2,2'-bis(trifluoromethyl)-4,4'-diaminobiphenyl as diamine, and reacting it with tetracarboxylic dianhydride having at least two aromatic rings. The repeating unit in the general formula (II) can be obtained, for example, by using 2,2-bis(3,4-dicarboxyphenyl)hexafluoropropanoic dianhydride as tetracarboxylic dianhydride, and reacting it with diamine having at least two aromatic rings. The reaction may be, for example, chemical imidization that proceeds in two stages or thermal imidization that proceeds in one stage.

As the tetracarboxylic dianhydride, any suitable one can be employed. Examples of the tetracarboxylic dianhydride include: 2,2'-bis(3,4-dicarboxyphenyl)-hexafluoropropanoic dianhydride; 3,3',4,4'-benzophenonetetracarboxylic dianhydride; 2,3,3',4-benzophenonetetracarboxylic dianhydride; 2,2',3,3'-benzophenonetetracarboxylic dianhydride; 2,2'-dibromo-4,4',5,5'-biphenyltetracarboxylic dianhydride; 2,2'-bis(trifluoromethyl)-4,4',5,5'-biphenyltetracarboxylic dianhydride; 3,3',4,4'-biphenyltetracarboxylic dianhydride; 4,4'-bis(3,4-dicarboxyphenyl)ether dianhydride; 4,4'-oxydiphthalic dianhydride; 4,4'-bis(3,4-dicarboxyphenyl) sulfonic dianhydride; bis(2,3-dicarboxyphenyl)methane dianhydride; and bis(3,4-dicarboxyphenyl)diethylsilane dianhydride.

As the diamine, any suitable one can be employed. Examples of the diamine include: 2,2'-bis(trifluoromethyl)-4,4'-diaminobiphenyl; 4,4'-diaminobiphenyl; 4,4'-diaminophenyl methane; 4,4'-(9-fluorenylidene)-dianiline; 3,3'-dichloro-4,4'-diaminophenyl methane; 2,2'-dichloro-4,4'-diaminobiphenyl; 4,4'-diaminodiphenyl ether; 3,4'-diaminodiphenyl ether; 4,4'-diaminodiphenyl sulfone; and 4,4'-diaminodiphenyl thioether.

As the weight average molecular weight (Mw) of the polyimide-based resin, the weight average molecular weight (Mw) using polyethylene oxide standard including as a developing solvent a dimethylformamide solution (1 L of a dimethylformamide solution prepared by: adding 10 mM lithium bromide and 10 mM phosphoric acid; and making up to 1 L) is preferably 20,000 to 180,000. Further, the imidation rate of the polyimide-based resin is preferably 95% or more. The imidation rate can be determined with a nuclear magnetic resonance (NMR) spectrum by using an integrated intensity ratio of a peak of proton derived from polyamic acid, which is a precursor of polyimide, and a peak of proton derived from polyimide.

The retardation film containing the polyimide-based resin can be obtained by any suitable forming method. Preferably, the retardation film containing the polyimide-based resin is produced by stretching a polymer film which has been formed into a sheet by solvent casting, by using a longitudinal uniaxial stretching method or a transverse uniaxial stretching method. The temperature (stretching temperature) at which the polymer film is stretched is preferably 120° C. to 200° C. Further, the magnification (stretching ratio) at which the polymer film is stretched is preferably more than 1 to 3 times or less.

(Cellulose-Based Resin)

As the cellulose-based resin, any appropriate cellulose-based resin can be adopted. Preferably, a cellulose organic acid ester or a cellulose mixed organic acid ester is used, which is obtained by substituting an acetyl group, a propionyl group, and/or a butyl group for a part or an entirety of a hydroxy group of cellulose. Specific examples of the cellulose organic acid ester include cellulose acetate, cellulose propionate, and cellulose butylate. Specific examples of the cellulose mixed organic acid ester include cellulose acetate propionate and cellulose acetate butylate. Such a cellulose-based resin can be obtained by the method described, for example, in [0040] and [0041] of JP 2001-188128 A.

The acetyl substitution degree of the above cellulose acetate is preferably 2.0 to 3.0 and more preferably 2.5 to 3.0. The propionyl substitution degree of the above cellulose propionate is preferably 2.0 to 3.0 and more preferably 2.5 to 3.0. In the case where the cellulose-based resin is a mixed organic acid ester in which a part of a hydroxy group of cellulose is substituted by an acetyl group and another part of a hydroxy group of cellulose is substituted by a propionyl group, the total of the acetyl substitution degree and the propionyl substitution degree is preferably 2.0 to 3.0 and more preferably 2.5 to 3.0. In this case, the acetyl substitution degree is preferably 0.1 to 2.9, and the propionyl substitution degree is preferably 0.1 to 2.9.

In the specification of the present invention, the acetyl substitution degree (or the propionyl substitution degree) refers to the number of acetyl groups (or propionyl groups) by which hydroxy groups attached to carbon at 2, 3, 6-positions in a cellulose skeleton is substituted. The acetyl groups (or propionyl groups) may be substituted at any carbon at 2, 3, 6-positions in a cellulose skeleton concentratedly, or may be present evenly. The above-mentioned acetyl substitution degree can be obtained by ASTM-D817-91 (test method for cellulose acetate, etc.). Further, the above-mentioned propionyl substitution degree can be obtained by ASTM-D817-96 (test method for cellulose acetate, etc.).

As the weight average molecular weight (Mw) of the cellulose-based resin, a value measured by a gel permeation chromatography method (polystyrene standard) with a tetrahydrofuran solvent is preferably 20,000 to 1,000,000. The glass transition temperature (Tg) of the cellulose-based resin is preferably 110° C. to 185° C. Note that the glass transition temperature (Tg) is a value calculated by a DSC method in accordance with JIS K 7121. With the above resin, a film having excellent heat stability and excellent mechanical strength can be obtained.

The retardation film containing the cellulose-based resin can be obtained by any suitable forming method. Preferably, the retardation film containing the cellulose-based resin is manufactured by stretching a film, which had been formed into a sheet, by solvent casting by transverse uniaxial stretching, longitudinal and transverse simultaneous biaxial stretching, or longitudinal and transverse sequential biaxial stretching. The temperature (stretching temperature) at which the film is stretched is preferably 120° C. to 200° C. Further, the magnification (stretching ratio) at which the film is stretched is preferably more than 1 to 3 times or less.

As the retardation film, a commercially available film can be used as it is. Alternatively, any commercially available film may be subjected to secondary treatment such as stretching and/or contraction. Examples of the commercially available polymer film containing a cellulose-based resin include FUJITAC series (ZRF80S, TD80UF, TDY-80UL (trade name)) manufactured by Fujifilm Corporation, and "KC8UX2M" (trade name) manufactured by Konica Minolta Opto, Inc.

The retardation film used as the first protective layer may further contain any appropriate additive. Examples of the additive include a plasticizer, a thermal stabilizer, a light stabilizer, a lubricant, an antioxidant, a UV absorbing agent, a flame retardant, a colorant, an antistatic agent, a compatibilizer, a cross-linking agent, and a thickener. The content of the additive is preferably more than 0 to 10 parts by weight or less with respect to 100 parts by weight of the resin as a main component.

<F. Second Protective Layer>

A second protective layer of the present invention is placed between the second polarizer and the liquid crystal cell. The second protective layer is, for example, used in order to prevent the second polarizer from contracting and expanding. The second protective layer is preferably bonded to the second polarizer via an adhesion layer. The second protective layer may be a single layer or a laminate formed of a plurality of layers. The thickness of the second protective layer is preferably 10 µm to 200 µm. The transmittance (T[590]) at a wavelength of 590 nm of the second protective layer is preferably 90% or more.

In the second protective layer, the refractive index ellipsoid preferably exhibits a relationship of nx=ny>nz or nx=ny=nz. In the specification of the present invention, "nx=ny" means that Re[590] of the second protective layer is less than 10 nm and preferably 5 nm or less. Further, "nx=nz" means that |Rth[590]| of the second protective layer is less than 10 nm and preferably less than 5 nm.

In the case where the refractive index ellipsoid of the second protective layer exhibits a relationship of nx=ny>nz, preferably, Rth[590] of the second protective layer may be suitably set so that the liquid crystal cell is optically compensated in accordance with Rth[590] of the first protective layer. Rth[590] of the second protective layer is preferably 20 nm to 80 nm.

As a material for forming the second protective layer, any suitable material can be adopted. Preferably, the second protective layer is a polymer film containing a cellulose-based resin, a norbornene-based resin, or an acrylic resin. The polymer film containing a cellulose-based resin can be obtained, for example, by a method described in Example 1 of JP 07-112446 A. The polymer film containing a norbornene-based resin can be obtained, for example, by a method described in JP 2001-350017 A. The polymer film containing an acrylic resin can be obtained, for example, by a method described in Example 1 of JP 2004-198952 A.

<F. Other Protective Layers>

For a practical use, the first polarizing plate used for the present invention includes a third protective layer on the opposite side of a liquid crystal cell side of a first polarizer, and the second polarizing plate includes a fourth protective layer on the opposite side of the liquid crystal cell side of a second polarizer. The third and fourth protective layers are used in order to prevent the polarizers from contracting and expanding, and to prevent degradation by UV light. The third and fourth protective layers may be the same as or different from each other.

As the third and fourth protective layers, any suitable layers can be adopted. The thickness of each of the third and fourth protective layers is preferably 10 µm to 200 µm. The transmittance (T[590]) at a wavelength of 590 nm of each of the third and fourth protective layers is preferably 90% or more. As a material for forming each of the third and fourth protective layers, any suitable materials can be adopted. Preferably, each of the third and fourth protective layers is a polymer film containing a cellulose-based resin, a norbornene-based resin, or an acrylic resin.

In the third and fourth protective layers, the surfaces thereof on the opposite side against the polarizer (outermost surfaces of the liquid crystal panel) may be subjected to any suitable surface treatment as long as the above relationship of a transmittance can be satisfied. For example, as the third and fourth protective layers, a commercially available polymer film subjected to a surface treatment can be used as it is. Alternatively, a commercially available polymer film can also be subjected to any surface treatment. Examples of the surface treatment include a diffusion treatment (anti-glare treatment), a reflection preventive treatment (antireflection treatment), a hard coat treatment, and an antistatic treatment. Examples of commercially available diffusion treatment (anti-glare treatment) products include AG150, AGS1, AGS2, and AGT1, manufactured by Nitto Denko Corporation. Examples of commercially available reflection preventive treatment (antireflection treatment) products include ARS and ARC manufactured by Nitto Denko Corporation. An example of a commercially available film subjected to a hard coat treatment and an antistatic treatment includes "KC8UX-HA" (trade name), manufactured by Konica Minolta Opto, Inc.

If required, a surface treatment layer may be provided on each of the opposite sides against the polarizers of the third and fourth protective layers (outermost surfaces of the liquid crystal panel). As the surface treatment layer, any suitable layer can be adopted in accordance with the purpose. Examples of the surface treatment layer include a diffusion treatment (anti-glare treatment) layer, a reflection preventive treatment (anti-reflection treatment) layer, a hard coat treatment layer, and an antistatic treatment layer. Those surface treatment layers are used for the purpose of preventing the contamination and damage of a screen, and preventing light from an indoor fluorescent lamp or sunlight from being reflected from a screen, which makes it difficult to see a display image. The surface treatment layer is generally obtained by allowing a treatment agent forming the treatment layer to adhere to the surface of a base film. The base film may also function as the third and fourth protective layers. Further, the surface treatment layer may have, for example, a multi-layered structure in which a hard coat treatment layer is laminated on an antistatic treatment layer. An example of the commercially available surface treatment layer subjected to a reflection preventive treatment includes ReaLook series manufactured by Nippon Oil and Fats Co., Ltd.

<F. Liquid Crystal Display Apparatus>

Figure 3:
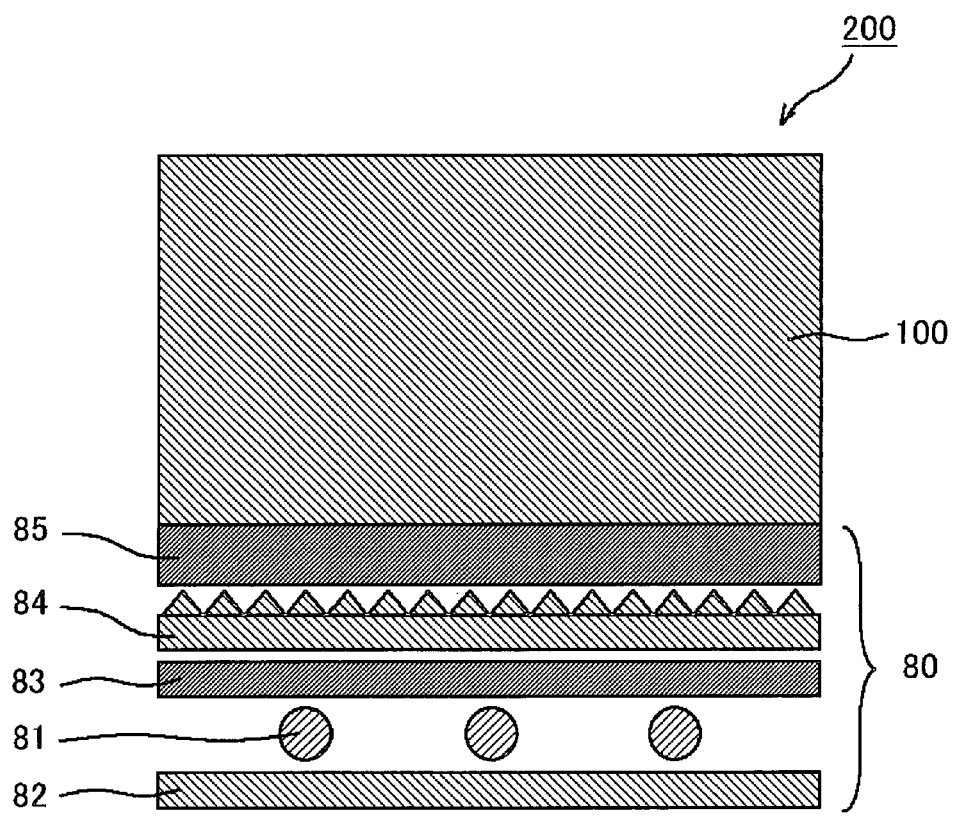
FIG. 3 Schematic cross-sectional view of a liquid crystal display apparatus according to a preferred embodiment of the present invention.

The liquid crystal display apparatus of the present invention includes the above liquid crystal panel. FIG. 3 is a schematic cross-sectional view of a liquid crystal display apparatus according to a preferred embodiment of the present invention. For ease of observation, it should be noted that the ratio of each constituent member in longitudinal, lateral, and thickness directions illustrated in FIG. 3 is different from the actual one. A liquid crystal display apparatus 200 at least includes a liquid crystal panel 100 and a backlight unit 80 placed on one side of the liquid crystal panel 100. In the illustrated example, the case where a backlight unit of a direct-type is adopted has been shown. However, for example, a sidelight-type may be used.

In the case where a direct-type is adopted, the backlight unit 80 preferably includes a light source 81, a reflective film 82, a diffusion plate 83, a prism sheet 84, and a brightness enhancing film 85. In the case where the sidelight-type is adopted, the backlight unit preferably further includes a light guide plate and a light reflector. As long as the effects of the present invention are obtained, a part of the optical member illustrated in FIG. 3 may be omitted or may be replaced by another optical element, depending upon the application such as an illumination system of a liquid crystal display apparatus and a driving mode of a liquid crystal cell.

The liquid crystal display apparatus may be of a transmissive type in which a screen is observed by irradiation of light from a back surface of a liquid crystal panel, or may be of a reflection type in which the screen is observed by irradiation of light from a viewer side of the liquid crystal panel. Alternatively, the liquid crystal display apparatus may be of a semi-transmissive type which has both the properties of the transmissive type and the reflection type. FIG. 3 shows the transmissive type.

The liquid crystal display apparatus of the present invention may be used for any appropriate applications. Specific example of the application includes: office automation (OA) devices such as a personal computer monitor, a laptop personal computer, and a copying machine; portable devices such as a cellular phone, a watch, a digital camera, a personal digital assistance (PDA), and a portable game machine; home appliances such as a video camera, a liquid crystal television, and a microwave; in-car devices such as a back monitor, a car navigation system monitor, and a car audio; display devices such as a commercial information monitor; security devices such as a surveillance monitor; and nursing care/medical devices such as a nursing monitor and a medical monitor.

Preferably, the liquid crystal display apparatus of the present invention is applied to a television. The screen size of the television is preferably wide 17-type (373 mm×224 mm) or more, more preferably wide 23-type (499 mm×300 mm) or more, and particularly preferably wide 32-type (687 mm×412 mm) or more.

EXAMPLES

The present invention will be described in more detail by using the following examples and comparative examples. However, the present invention is not limited to the examples. Analytical methods used in the examples are described below.

(1) Light Transmittance of Polarizing Plate:

A light transmittance (T) is a Y value of tristimulus values obtained through visibility correction by a two-degree field of view in accordance with JIS Z 8701-1995.

(2) Method of Measuring Content of Each Element (I, K)

The content of each element was obtained from an X-ray intensity obtained by measuring a circular sample with a diameter of 10 mm by fluorescent X-ray analysis under the following conditions, with a calibration curve previously created using a standard sample.

Analyzer: fluorescent X-ray analyzer (XRF) "ZSX 100e" (trade name), manufactured by Rigaku Corporation Anti-cathode: rhodium Analyzing crystal: lithium fluoride Excitation light energy: 40 kV-90 mA Iodine measurement line: I-LA Potassium measurement line: K-KA Quantifying method: FP method 2θ angle peak: 103.078 deg (iodine), 136.847 deg (potassium)

Measurement time: 40 seconds (3) Method of Determining Retardation Values (Re[λ] and Rth[λ]), Nz Coefficient, and T[590]

The retardation values were determined by using "KOBRA21-ADH" (trade name, manufactured by Oji Scientific Instruments) at 23° C. The average refractive index was determined by measuring refractive indices by using an Abbe refractometer "DR-M4" (trade name, manufactured by Atago Co., Ltd.).

(4) Method of Measuring Thickness

A thickness of less than 10 μm was measured by using a thin film thickness spectrophotometer "Multichannel photodetector MCPD-2000" (trade name, manufactured by Otsuka Electronics Co., Ltd.). A thickness of 10 μm or more was measured by using a digital micrometer "KC-351C type" (trade name, manufactured by Anritsu Corporation).

(5) Method of Determining Molecular Weight of Polyimide-Based Resin

The molecular weight was calculated through gel permeation chromatography (GPC) by using polystyrene oxide as a standard sample. Apparatus, instruments, and measurement conditions are as follows.

Sample: 0.1% by weight of solution was prepared by dissolving a sample in an eluant.

Pretreatment: after the solution was left at rest for 8 hours, the solution was filtered with a membrane filter of 0.45 μm.

Analyzer: "HLC-8020GPC" manufactured by Tosoh Corporation

Column: $GMH_{XL}+GMH_{XL}+G2500H_{XL}$ manufactured by Tosoh Corporation

Column size: 7.8 mmφ×30 cm each (90 cm in total)

Eluant: dimethylformaldehyde (1 L of dimethylformaldehyde solution obtained by adding 10 mM of lithium bromide to 10 mM of phosphoric acid, followed by mixing)

Flow rate: 0.8 ml/min.

Detector: RI (differential refractometer)

Column temperature: 40° C.

Injection amount: 100 μl (6) Method of Determining Molecular Weight of Norbornene-Based Resin The molecular weight was calculated through gel permeation chromatography (GPC) by using polystyrene as a standard sample. To be specific, the molecular weight was determined under the following measurement conditions by using the following apparatus and instruments.

Measurement sample: the sample was dissolved in tetrahydrofuran to form a solution of 0.1% by weight.

Pretreatment: after the solution was left at rest for 8 hours, the solution was filtered with a membrane filter of 0.45 µm.

Analyzer: "HLC-8120GPC", manufactured by Tosoh Corporation

Column: TSKgel SuperHM-H/H4000/H3000/H2000

Column size: 6.0 mmI.D.×150 mm each

Eluant: tetrahydrofuran

Flow rate: 0.6 ml/minute

Detector: RI (differential refractometer)

Column temperature: 40° C.

Injection amount: 20 µl (7) Method of Measuring Glass Transition Temperature

The glass transition temperature was obtained by a method in accordance with JIS K 7121 (1987) (method of measuring a transition temperature of plastic), using a differential scanning calorimeter "DSC-6200" (trade name, manufactured by Seiko Co., Ltd.). Specifically, 3 mg of powdery sample were measured twice by raising a temperature (heating speed: 10° C./min.) in a nitrogen atmosphere (flow rate of gas: 80 ml/min.), and the second data was adopted. The calorimeter was corrected for temperature, using a standard material (indium).

(8) Method of Measuring Absolute Value (C[590]) of Photoelastic Coefficient

The retardation value (23° C./wavelength of 590 nm) of the center of a sample (size: 2 cm×10 cm) was measured while a stress (5 to 15 N) was being applied thereto, with both ends of the sample held, using a spectroscopic ellipsometer "M-220" (trade name, manufactured by JASCO Corporation), and the absolute value of the photoelastic coefficient was calculated from a slope of a function between the stress and the retardation value.

(9) Method of Measuring Contrast Ratio in Front Direction of Liquid Crystal Display Apparatus A backlight was lit in a dark room at 23° C. for 30 minutes, and thereafter, a lens was placed at a position of 50 cm above a panel, using "BM-5" (trade name, manufactured by Topcon Corporation) Then, a white image and a black image were displayed. A Y-value in an XYZ display system at this time was measured. A contrast ratio "$Y_W/Y_B$" in a front direction was calculated from a Y-value ($Y_W$: white brightness) in the white image and a Y-value ($Y_B$: black brightness) in the black image.

Production of Polarizer

Reference Example 1

A polymer film ("VF-PS#7500" (trade name), manufacture by Kuraray Co., Ltd.) with a thickness of 75 µm containing a polyvinyl alcohol-based resin as a main component was soaked in 5 baths under the following conditions [1] to [5] while the tension was being applied to the film in a longitudinal direction, and stretched so that the final stretching ratio became 6.2 times with respect to the film original length. The stretched film was dried in an air-circulating drying oven at 40° C. for 1 minute, whereby a polarizer A was produced. In this polarizer A, the contents of the respective elements were as follows: iodine content=2.95% by weight, potassium content=0.62% by weight, and boron content=2% by weight.

<Conditions>

[1] Swelling bath: pure water at 30° C.

[2] Coloring bath: aqueous solution at 30° C. containing 0.032 part by weight of iodine with respect to 100 parts by weight of water and 0.2 part by weight of potassium iodide with respect to 100 parts by weight of water

[3] First cross-linking bath: aqueous solution at 40° C. containing 3% by weight of potassium iodide and 3% by weight of boric acid

[4] Second cross-linking bath: aqueous solution at 60° C. containing 5% by weight of potassium iodide and 4% by weight of boric acid

[5] Washing bath: aqueous solution at 25° C. containing 3% by weight of potassium iodide Reference Example 2

A polarizer B was produced under the same conditions and by the same method as those in Reference Example 1, except that, in the coloring bath, the adding amount of iodine in Condition [2] was 0.030 part by weight with respect to 100 parts by weight of water. In this polarizer B, the contents of the respective elements were as follows: iodine content=2.63% by weight, potassium content=0.60% by weight, and boron content=2% by weight.

Reference Example 3

A polarizer C was produced under the same conditions and by the same method as those in Reference Example 1, except that, in the coloring bath, the adding amount of iodine in Condition [2] was 0.027 part by weight with respect to 100 parts by weight of water. In this polarizer C, the contents of the respective elements were as follows: iodine content=2.09% by weight, potassium content=0.58% by weight, and boron content=2% by weight.

Production of First Protective Layer

Reference Example 4

To a reaction container (500 mL) equipped with a mechanical stirring device, a Dean and Stark device, a nitrogen guide tube, a thermometer, and a cooling tube, 17.77 g (40 mmol) of 2,2'-bis(3,4-dicarboxylphenyl)hexafluoropropanoic dianhydride (manufactured by Clariant (Japan) K.K.) and 12.81 g (40 mmol) of 2,2-bis(trifluoromethyl)-4,4'-diaminobiphenyl (manufactured by Wakayama Seika Kogyo Co., Ltd.) were charged. Then, a solution in which 2.58 g (20 mmol) of isoquinoline was dissolved in 275.21 g of m-cresol was added to the mixture, followed by stirring (600 rpm) at 23° C. for 1 hour, whereby a uniform solution was obtained. Next, the reaction container was heated so that the temperature in the reaction container became 180±3° C., using an oil bath, followed by stirring for 5 hours while the temperature was kept, whereby a yellow solution was obtained. After the mixture was further stirred for 3 hours, heating and stirring were stopped, and the mixture was allowed to cool to room temperature, whereby the polymer was precipitated as a gel.

Acetone was added to the yellow solution in the reaction container to dissolve the gel completely, whereby a diluted solution (7% by weight) was produced. When the diluted solution was added little by little to 2 L of isopropyl alcohol while stirring, white powder was precipitated. The powder was filtered out, and washed by loading the powder into 1.5 L of isopropyl alcohol. The powder was further washed again by repeating the same operation, and thereafter, the powder was filtered out again. The resultant powder was dried in an air-circulating thermostatic oven at 60° C. for 48 hours, and then, dried at 150° C. for 7 hours, whereby powder of polyimide of the following structural formula (III) was obtained with a yield of 85%. The polymerization average molecular weight (Mw) of the polyimide was 124,000, and the imidization ratio was 99.9%.

[Chemical Formula 3]

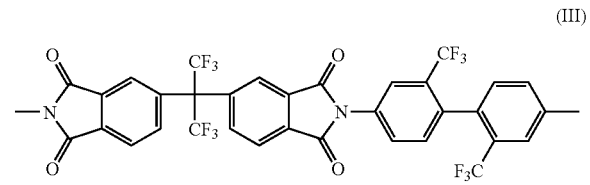

(III)

The polyimide powder was dissolved in methylisobutylketone to prepare 15% by weight of polyimide solution. The polyimide solution was flow-casted uniformly to a sheet with a slot die coater on the surface of a triacetylcelullose film having a thickness of 80 μm ("TD80UF" (trade name), manufactured by Fujifilm Corporation; Re[590]=0 nm, Rth[590]= 60 nm). Next, the film was placed in a multi-chamber air-circulating drying oven, and a solvent was evaporated while the temperature was raised gradually from a low temperature of 80° C. for 2 minutes, 135° C. for 5 minutes, to 150° C. for 10 minutes, thereby obtaining a laminate formed of a polyimide layer and a triacetylcelullose film. Next, the laminate was stretched by 1.14 times at 147° C. by fixed-end transverse uniaxial stretching, using a tenter stretching machine. Then, a laminate (B) formed of the polyimide layer with a thickness of 3.4 μm and the triacetylcelullose film was obtained. In the laminate (B), the refractive index ellipsoid exhibits a relationship of nx>ny>nz, and T[590]=91%, Re[590]=50 nm, Rth [590]=270 nm, and Nz coefficient=4.8. Note that, in the polyimide layer part of the laminate (B), the optical properties exhibit a relationship of Re[590]=48 nm, Rth[590]=210 nm, and $\Delta n_{xz}$=0.06.

Production of First Polarizing Plate

Reference Example 5

The laminate (B) obtained in Reference Example 4 was attached to one side of the polarizer A obtained in Reference Example 1 via a water-soluble adhesive ("GOHSEFIMER Z200" (trade name), manufactured by Nippon Synthetic Chemical Industry Co., Ltd.) containing a polyvinyl alcohol-based resin as a main component, in such a manner that the triacetylcelullose side of the laminate (B) faced the polarizer A and that a slow axis direction of the laminate (B) was perpendicular to an absorption axis direction of the polarizer A. Next, a polymer film ("TD80UF" (trade name), manufactured by Fujifilm Corporation) having a thickness of 80 μm and containing a cellulose-based resin was attached to the other side of the polarizer A via the water-soluble adhesive. The polarizing plate A1 had a polarization degree of 99.9% and a transmittance ($T_1$) of 41.5%.

Reference Example 6

A polarizing plate B1 was produced by the same method as that in Reference Example 5, except that the polarizer B obtained in Reference Example 2 was used instead of the polarizer A. The polarizing plate B1 had a polarization degree of 99.9% and a transmittance ($T_1$) of 42.6%.

Reference Example 7

A polarizing plate C1 was produced by the same method as that in Reference Example 5, except that the polarizer C obtained in Reference Example 3 was used instead of the polarizer A. The polarizing plate C1 had a polarization degree of 99.9% and a transmittance ($T_1$) of 43.5%.

Production of Second Polarizing Plate

Reference Example 8

A polymer film ("TD80UF" (tradename), manufactured by Fujifilm Corporation; Re[590]=0 nm, Rth[590]=60 nm) having a thickness of 80 μm and containing a cellulose-based resin was attached to both sides of the polarizer A obtained in Reference Example 1 via a water-soluble adhesive ("GOHSEFIMER Z200" (trade name), manufactured by Nippon Synthetic Chemical Industry Co., Ltd.) containing a polyvinyl alcohol-based resin as a main component, whereby a polarizing plate A2 was produced. The polarizing plate A2 had a polarization degree of 99.9% and a transmittance ($T_2$) of 41.5%.

Reference Example 9

A polarizing plate B2 was produced by the same method as that in Reference Example 8, except that the polarizer B obtained in Reference Example 2 was used instead of the polarizer A. The polarizing plate B2 had a polarization degree of 99.9% and a transmittance ($T_2$) of 42.6%.

Reference Example 10

A polarizing plate C2 was produced by the same method as that in Reference Example 9, except that the polarizer C obtained in Reference Example 3 was used instead of the polarizer A. The polarizing plate C2 had a polarization degree of 99.9% and a transmittance ($T_2$) of 43.5%.

Preparation of Liquid Crystal Cell

Reference Example 11

A liquid crystal panel was taken out from a commercially available liquid crystal display apparatus in a normally black mode (40-inch liquid crystal television "BRAVIA KDL-32V1000" (tradename) manufactured by Sony Corporation) including a liquid crystal cell of a VA mode, and all the optical films such as polarizing plates placed on upper and lower sides of the liquid crystal cell were removed. The surfaces of glass plates on both sides of the liquid crystal cell were washed to obtain a liquid crystal cell A.

Production of Liquid Crystal Panel and Liquid Crystal Display Apparatus (I)

Example 1

The polarizing plate B1 produced in Reference Example 6 was attached, as a first polarizing plate, to a viewer side of the liquid crystal cell A produced in Reference Example 11 in such a manner that a laminate (B) side was arranged on a liquid crystal cell side, via an acrylic pressure-sensitive adhesive (thickness: 20 μm) so that the absorption axis direction of the polarizing plate B1 was substantially parallel to the long side direction of the liquid crystal cell A. Then, the polarizing plate A2 produced in Reference Example 8 was attached, as a second polarizing plate, to the opposite side (backlight side) against the viewer side of the liquid crystal cell A via an acrylic pressure-sensitive adhesive (thickness: 20 μm) so that the absorption axis direction of the polarizing plate A2 was substantially perpendicular to the long side direction of the liquid crystal cell A. At this time, the absorption axis direction of the first polarizing plate and the absorption axis direction of the second polarizing plate were substantially perpendicular to each other. The thus produced liquid crystal panel A in a normally black mode was combined with a backlight unit of an original liquid crystal display apparatus, whereby a liquid crystal display apparatus A was produced. The properties of the obtained liquid crystal display apparatus A are shown in the following Table 1.

TABLE 1

|  | Viewer side | | Backlight side | | | contrast |
|---|---|---|---|---|---|---|
|  | First polarizing plate | $T_1$ (%) | Second polarizing plate | $T_2$ (%) | $\Delta T$ ($T_1 - T_2$) | ratio in front direction |
| Example 1 | B1 | 42.6 | A2 | 41.5 | 1.1 | 1,526 |
| Example 2 | C1 | 43.5 | A2 | 41.5 | 2.0 | 1,475 |
| Comparative Example 1 | A1 | 41.5 | B2 | 42.6 | −1.1 | 1,379 |
| Comparative Example 2 | A1 | 41.5 | C2 | 43.5 | −2.0 | 1,285 |
| Comparative Example 3 | C1 | 43.5 | C2 | 43.5 | 0.0 | 1,275 |
| Comparative Example 4 | A1 | 41.5 | A2 | 41.5 | 0.0 | 1,110 |

Example 2

A liquid crystal panel B and a liquid crystal display apparatus B were produced by the same method as that in Example 1, except that the polarizing plate C1 produced in Reference Example 7 was used as the first polarizing plate. The properties of the obtained liquid crystal display apparatus B are shown in Table 1.

Comparative Example 1

A liquid crystal panel H and a liquid crystal display apparatus H were produced by the same method as that in Example 1, except that the polarizing plate A1 produced in Reference Example 5 was used as the first polarizing plate, and the polarizing plate B2 produced in Reference Example 9 was used as the second polarizing plate. The properties of the obtained liquid crystal display apparatus H are shown in Table 1.

Comparative Example 2

A liquid crystal panel I and a liquid crystal display apparatus I were produced by the same method as that in Example 1, except that the polarizing plate A1 produced in Reference Example 5 was used as the first polarizing plate, and the polarizing plate C2 produced in Reference Example 10 was used as the second polarizing plate. The properties of the obtained liquid crystal display apparatus I are shown in Table 1.

Comparative Example 3

A liquid crystal panel J and a liquid crystal display apparatus J were produced by the same method as that in Example 1, except that the polarizing plate C1 produced in Reference Example 7 was used as the first polarizing plate, and the polarizing plate C2 produced in Reference Example 10 was used as the second polarizing plate. The properties of the obtained liquid crystal display apparatus J are shown in Table 1.

Comparative Example 4

A liquid crystal panel K and a liquid crystal display apparatus K were produced by the same method as that in Example 1, except that the polarizing plate A1 produced in Reference Example 5 was used as the first polarizing plate, and the polarizing plate A2 produced in Reference Example 8 was used as the second polarizing plate. The properties of the obtained liquid crystal display apparatus K are shown in Table 2.

Production of Liquid Crystal Panel and Liquid Crystal Display Apparatus (II)

Example 3

The polarizing plate A2 produced in Reference Example 8 was attached, as a second polarizing plate, to a viewer side of the liquid crystal cell A produced in Reference Example 11 via an acrylic pressure-sensitive adhesive (thickness: 20 μm) so that the absorption axis direction of the polarizing plate A2 was substantially parallel to the long side direction of the liquid crystal cell A. Then, the polarizing plate B1 produced in Reference Example 6 was attached, as a first polarizing plate, to the opposite side (backlight side) against the viewer side of the liquid crystal cell A in such a manner that a laminate (B) side was arranged on a liquid crystal cell side, via an acrylic pressure-sensitive adhesive (thickness: 20 μm) so that the absorption axis direction of the polarizing plate B1 was substantially perpendicular to the long side direction of the liquid crystal cell A. At this time, the absorption axis direction of the first polarizing plate and the absorption axis direction of the second polarizing plate are substantially perpendicular to each other. The thus produced liquid crystal panel C was combined with a backlight unit of an original liquid crystal display apparatus, whereby a liquid crystal display apparatus C was produced. The properties of the obtained liquid crystal display apparatus C are shown in the following Table 2.

TABLE 2

|  | Viewer side | | Backlight side | | | contrast |
|---|---|---|---|---|---|---|
|  | Second polarizing plate | $T_2$ (%) | First polarizing plate | $T_1$ (%) | $\Delta T$ ($T_1 - T_2$) | ratio in front direction |
| Example 3 | A2 | 41.5 | B1 | 42.6 | 1.1 | 1,739 |
| Example 4 | A2 | 41.5 | C1 | 43.5 | 2.0 | 1,501 |
| Comparative Example 5 | B2 | 42.6 | A1 | 41.5 | −1.1 | 1,498 |
| Comparative Example 6 | C2 | 43.5 | A1 | 41.5 | −2.0 | 1,448 |
| Comparative Example 7 | C2 | 43.5 | C1 | 43.5 | 0.0 | 1,479 |

Example 4

A liquid crystal panel D and a liquid crystal display apparatus D were produced by the same method as that in Example 3, except that the polarizing plate C1 produced in Reference Example 7 was used as the first polarizing plate. The properties of the obtained liquid crystal display apparatus D are shown in Table 1.

Comparative Example 5

A liquid crystal panel O and a liquid crystal display apparatus O were produced by the same method as that in Example 3, except that the polarizing plate B2 produced in Reference Example 9 was used as the second polarizing plate, and the polarizing plate A1 produced in Reference Example 5 was used as the first polarizing plate. The properties of the obtained liquid crystal display apparatus O are shown in Table 2.

Comparative Example 6

A liquid crystal panel P and a liquid crystal display apparatus P were produced by the same method as that in Example 3, except that the polarizing plate C2 produced in Reference Example 10 was used as the second polarizing plate, and the polarizing plate A1 produced in Reference Example 5 was used as the first polarizing plate. The properties of the obtained liquid crystal display apparatus P are shown in Table 2.

Comparative Example 7

A liquid crystal panel Q and a liquid crystal display apparatus Q were produced by the same method as that in Example 3, except that the polarizing plate C2 produced in Reference Example 10 was used as the second polarizing plate, and the polarizing plate C1 produced in Reference Example 7 was used as the first polarizing plate. The properties of the obtained liquid crystal display apparatus Q are shown in Table 2.

[Evaluation]

The liquid crystal display apparatus including a liquid crystal panel of the present invention could, as shown in Examples 1 to 4, exhibit a remarkably higher contrast ratio in a front direction, compared with a conventional liquid crystal apparatus, by setting the transmittance ($T_1$) of the first polarizing plate to be higher than the transmittance ($T_2$) of the second polarizing plate. On the other hand, in the liquid crystal display apparatuses of Comparative Examples 1 to 7, the transmittance ($T_1$) of the first polarizing plate is smaller than the transmittance ($T_2$) of the second polarizing plate, or the transmittance ($T_1$) of the first polarizing plate is equal to the transmittance ($T_2$) of the second polarizing plate, and the contrast ratios of those liquid crystal display apparatuses in a front direction were low.

INDUSTRIAL APPLICABILITY

As described above, the liquid crystal panel of the present invention can exhibit a high contrast ratio in a front direction in the case of being used in a liquid crystal display apparatus, so the liquid crystal panel is significantly useful for enhancing the display properties of a liquid crystal television, a personal computer monitor, and a mobile telephone.

The invention claimed is:
1. A liquid crystal panel, comprising:
a liquid crystal cell;
a first polarizing plate placed on one side of the liquid crystal cell; and
a second polarizing plate placed on another side of the liquid crystal cell, wherein:
the first polarizing plate comprises a first polarizer and a first protective layer which is placed on a liquid crystal cell side of the first polarizer, and a refractive index ellipsoid of the first protective layer exhibits a relationship of nx>ny>nz; and
a transmittance ($T_1$) of the first polarizing plate is higher than a transmittance ($T_2$) of the second polarizing plate; and wherein a difference ($\Delta T = T_1 - T_2$) between the transmittance ($T_1$) of an entirety of the first polarizing plate and the transmittance ($T_2$) of an entirety of the second polarizing plate is 0.1% to 6.0%, wherein the light transmittance ($T_1$) of the first polarizer is 41.1% to 44.3% and the light transmittance ($T_2$) of the second polarizer is 38.3% to 43.3%; and
wherein the first polarizer and the second polarizer each contain as a main component a polyvinyl alcohol-based resin containing iodine; and
wherein a slow axis direction of the first protective layer is substantially perpendicular to an absorption axis direction of the first polarizer.

2. A liquid crystal panel according to claim 1, wherein the liquid crystal cell contains liquid crystal molecules arranged in a homeotropic alignment.

3. A liquid crystal panel according to claim 1, wherein the second polarizing plate is placed on a viewer side of the liquid crystal cell, and the first polarizing plate is placed on an opposite side of the viewer side of the liquid crystal cell.

4. A liquid crystal panel according to claim 1, wherein a difference ($\Delta I = I_2 - I_1$) between an iodine content ($I_2$) of the second polarizer and an iodine content ($I_1$) of the first polarizer is 0.1% by weight to 2.6% by weight.

5. A liquid crystal panel according to claim 1, wherein an iodine content of each of the first polarizer and the second polarizer is 1.8% by weight to 5.0% by weight.

6. A liquid crystal panel according to claim 1, wherein a thickness direction retardation value (Rth[590]) at a wavelength of 590 nm of the first protective layer is 50 nm to 500 nm.

7. A liquid crystal panel according to claim 1, wherein an Nz coefficient of the first protective layer is more than 1.1 to no more than 8.

8. A liquid crystal panel according to claim 1, wherein the first protective layer is a retardation film (A) containing a polyimide-based resin or a cellulose-based resin or a laminate (B) formed of a polyimide-based resin-containing retardation film ($b_1$) and a cellulose-based resin-containing retardation film ($b_2$).

9. A liquid crystal panel according to claim 1, wherein the liquid crystal panel is in a normally black mode.

10. A liquid crystal display apparatus, comprising the liquid crystal panel according to claim 1.

* * * * *